Oct. 16, 1951     T. L. KENDALL     2,571,893
SUBMERSIBLE VENT CAP

Filed Nov. 4, 1949

INVENTOR
THOMAS L. KENDALL
BY *His Attorneys*

Patented Oct. 16, 1951

2,571,893

UNITED STATES PATENT OFFICE 2,571,893

SUBMERSIBLE VENT CAP

Thomas L. Kendall, Muncie, Ind., assignor to General Motors Corporation, Detroit, Mich., a corporation of Delaware Application November 4, 1949, Serial No. 125,405

4 Claims. (Cl. 136—178)

1

This invention relates to a vent cap for a storage battery and is particularly concerned with a submersible type of vent cap or plug which will permit submerging of the battery without damage thereto.

It is, therefore, an object of the invention to provide a storage battery cap or storage battery cell plug which permits flow of gases from the cell in one direction but which prevents ingress of air, water or the like into the cell so that the cell may be submerged in water or the like without harm thereto.

In carrying out the above objects, it is a further object of the present invention to provide a vent cap having a valving means therein which permits fluid flow outwardly of the cell only.

A still further object of the invention is to provide a vent cap formed from a resilient material, whereby the gasket and the like are eliminated due to the self-sealing effect of the threads of the vent cap of the battery cell cover.

Another object of the invention is to provide a vent cap for use with storage batteries used in marine applications and the like wherein the battery cell is protected against ingress of any harmful fluid, such as water, if and when the battery becomes submerged.

Further objects and advantages of the present invention will be apparent from the following description, reference being had to the accompanying drawing, wherein a preferred embodiment of the present invention is clearly shown.

Vent caps, or vent plugs as they are sometimes called, for storage battery cells, are provided to permit testing and filling of the battery with liquid, such as acid, water or both. These caps or plugs are merely screw type closures having a gas passage therethrough which, in the conventional type of plug, permits ingress or egress of fluids into the cell. It is apparent that lead-acid type batteries, among others, when charged, create gases which must be emitted from the cell to prevent breaking up of the cell case due to excessive pressure therein.

One of the major problems in marine applications and at the present time in ordnance and naval applications is to provide a battery which may be used in vehicles or boats wherein the battery may become submerged in water during use. Submersion of conventional types of batteries causes the battery to become inoperative due to ingress of water into the cells. Therefore, the present invention is directed to a submersible type of vent cap which permits the egress of battery gases from the cells through a valving mechanism therein but which prevents the ingress of any fluid from the outside into the battery cell. Thus application of the present vent cap makes possible the use of conventional batteries in marine applications wherein the battery may become submerged in water.

Through the use of a combination of specific materials, I have simplified the valving mechanism within the cap and have also eliminated numerous assembly problems both in the cap and with respect to the cap and the cell.

Figure 1:
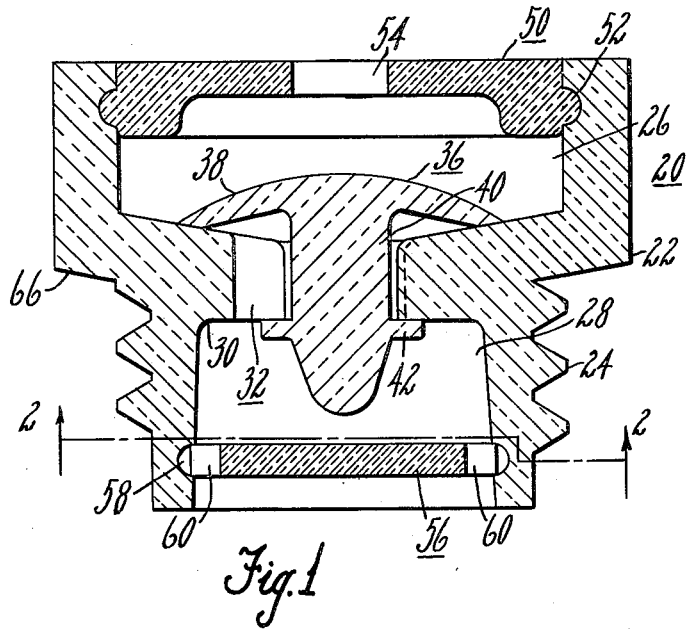
Fig. 1 is a view of the cross section of the preferred form of vent cap.
Figure 2:
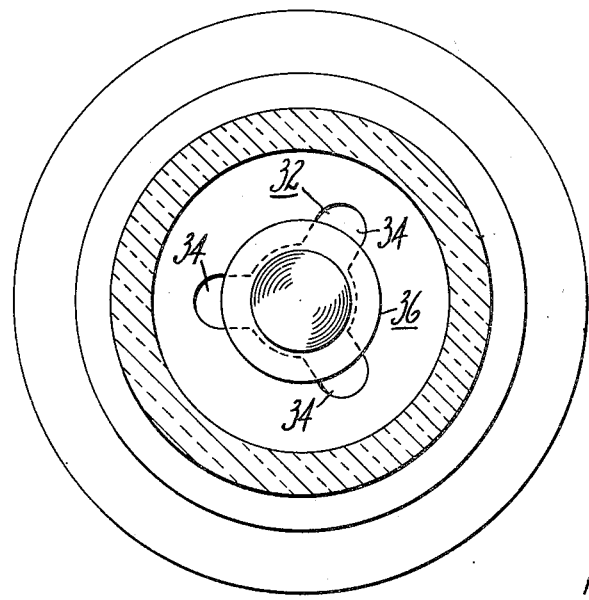
Fig. 2 is a sectional view taken on the line 2—2 of Fig. 1.

Referring specifically to Fig. 1, the improved submersible type of cap is shown at 20 which is fabricated from resilient material and which includes a main body portion 22 having an elongated threaded plug portion 24 thereon adapted to screw into a battery cell cover. The cap 20 is effectively divided into two compartments, namely, an upper compartment 26 and a lower compartment 28 separated by an apertured wall 30. The wall 30 includes an aperture 32 therethrough that in the present instance consists of a central aperture having three radially extending and equally spaced portions 34 which form the full aperture.

An integral valve 36 is provided for the aperture which is of mushroom-like extension having a relatively thin and resilient valving plate 38 at the upper portion thereof, a stem 40 of predetermined length which extends through the aperture and a stop 42 at the lower end thereof to prevent displacement of valve 36 from the aperture 32. In assembly, due to the resilient nature of the valve, it is merely necessary to press the same through the aperture 32 from chamber 26 whereby the stop 42 is resiliently deformed and passes through the aperture 32. When in place the valve 36 closes the aperture 32 since the stem 40 is of such length as to hold the plate 38 tight against the inner surface of chamber 26. However, due to the relatively thin and resilient character of plate 38, the same may be lifted upwardly or unseated from the wall of chamber 26 to permit egress of the battery gases when the cap is in place on the battery. As soon as the pressure has been released in the battery cell, the plate will again seat and seal the cell from any ingress of fluid from the outside.

At this point it may be well to explain that the cap 20 including the upper body portion 22 and the threaded plug portion 24 is also made of resilient material similar to that used in valve 36. In both cases, I prefer to use rubber or polyethylene, as a resilient material which may be extruded into a mold to form the cap and which is highly resistant to battery acids and the like and which has sufficient resiliency to permit the valve to function as stated. Polyethylene is sold under the trade name of 'Polythene" and is a polymerized ethylene compound of thermoplastic character which may be purchased in various grades for specific uses wherein the molecular weight varies from 15000–20000. The grade used in connection with this application is termed the "Extrusion Grade."

In order to close the cap a top plate 50 is provided which is made of a non-resilient material such as hard polystyrene phenol formaldehyde resins, hard rubber or other acid resisting hard materials. This plate 50 snaps into a groove 52 in the upper chamber 26 and closes the upper end of the cap with the exception of the small vent hole 54 in plate 50. Similarly, a lower baffle plate 56 made of like material is provided which snaps within a groove 58 included in the lower chamber 28. The plate 56 has two apertures 60 therethrough, preferably of half-moon extent, although any suitable aperture will be satisfactory. Plate 56 is also made of a non-resilient acid-resisting material.

The use of polyethylene in a suitably resilient form as a material for fabricating the battery cap is particularly desirable as the resiliency has another function in addition to the ease with which the cap may be assembled. Polyethylene has sufficient resilience to permit elimination of a gasket usually used during assembly thereof with the cell to effect a tight seal. In the present instance, the threads are sufficiently resilient so that they may be tightened directly to completely seal the cell without a gasket. It will be noted that the surface of cap 20 at the enlarged portion 22 thereof immediately adjacent the threads 24 is tapered slightly at 66. This taper aids in the sealing of the cell since, as the threads are drawn up tight, the tapered portion deforms and seals against the top of the cell cover.

It is apparent at this point that other resilient materials may be used in the battery cap fabrication if such materials are of an acid-resistant nature. For example, soft rubber may be used, as may certain forms of acid-resisting thermoplastic resins. In all events, however, I have found that polyethylene is an ideal material for the cap and is the preferred material to be used therein in combination with hard acid-resisting plates and the polyethylene valve.

From the foregoing it will be apparent that I have provided a new and improved vent cap which is submersible and prevents ingress of extraneous fluids into the battery but which permits the exhaust of battery gases from the cell. Through the use of a new material in the cap, it is possible to assemble the cap without the aid of cements, etc., and it is also possible to use the cap in connection with a battery cell without a gasket or other sealing means to effect a fluid-tight joint or connection.

While the embodiment of the present invention as herein disclosed, constitutes a preferred form, it is to be understood that other forms might be adopted.

What is claimed is as follows:

1. A submersible vent cap for use in connection with storage batteries, the combination comprising a body member fabricated from resilient polyethylene and including a threaded portion thereon adapted for attachment to a battery cell cover, said body portion including a central aperture therethrough and including a pair of spaced annular grooves on either side of said aperture, a resilient polyethylene valve extending through said aperture for normally resiliently sealing the same, said valve consisting of an enlarged plate member at the exhaust side of the cap capable of being unseated by excess pressure at the battery side of the cap whereby battery gas may be exhausted through said valve which seals the aperture against reverse flow therethrough, and a pair of hard acid-resisting apertured closure plates adapted to be snapped into said grooves in the resilient body member above and below the valve.

2. A submersible vent cap for use in connection with storage batteries, the combination comprising a body member fabricated from resilient acid-resisting material and including a threaded portion thereon adapted for attachment to a battery cell cover, said body portion including a central aperture therethrough and including a pair of spaced annular grooves on either side of said aperture, a resilient acid-resisting valve extending through said aperture for normally resiliently sealing the same, said valve consisting of an enlarged plate member at the exhaust side of the cap capable of being unseated by excess pressure at the battery side of the cap whereby battery gas may be exhausted through said valve which seals the aperture against reverse flow therethrough, and a pair of hard acid-resisting apertured closure plates associated with the resilient body member above and below the valve by attachment in said grooves.

3. A submersible vent cap for use in connection with storage batteries, the combination comprising; a resilient polyethylene body member including a threaded portion adapted for attachment to a battery cell cover and an upper chambered portion disposed above said threaded portion, said threaded portion and said chambered portion being separated by an apertured wall of defined thickness, a resilient polyethylene valve of substantially mushroom shape adapted to be pressed through said aperture in said wall and having an enlarged valve plate on the chambered side and an elongated stem passing through said aperture and of less diameter than the aperture, said stem terminating in a stop member of larger diameter than the aperture, the length of said stem being such that the valve plate is held in sealing relation to the apertured wall on the chambered side, whereby when the vent cap is in position within a battery cell cover, ingress of external fluids is presented by said valve, said valve being sufficiently resilient to unseat and permit egress of battery gases causing elevated pressures within said battery cell and a pair of hard acid-resisting polystyrene closure plates associated with said vent cap above and below said valve, said plates each including an aperture therethrough for permitting fluid flow.

4. A submersible vent cap for use in connection with storage batteries comprising in combination, a resilient polyethylene body member having an apertured wall separating the upper and lower portions thereof, the lower portion of said cap including threads molded therein of resilient character adapted to sealingly engage a cell cover when the cap is screwed in position therein, a resilient valve adapted for position in the upper portion of said body member and having a stem which passes through said apertured wall and which includes a stop on the lower side thereof for preventing displacement of the valve with respect to the apertured wall, said stem being dimensioned to normally hold the valve in sealing engagement with the wall, said valve, due to its resilient character, being capable of unseating to permit egress of battery gases causing elevated pressures within the battery cell but being so designed as to prevent ingress of fluids external to the battery, and protective apertured hard, acid resisting closure plates adapted to snap within grooves in the resilient body member above and below said valve.

THOMAS L. KENDALL.

REFERENCES CITED

The following references are of record in the file of this patent:

UNITED STATES PATENTS

| Number | Name | Date |
| --- | --- | --- |
| 850,913 | Edison | Apr. 23, 1907 |
| 2,163,477 | Warr et al. | June 20, 1939 |
| 2,204,088 | Kugler | June 11, 1940 |
| 2,351,177 | Younkman | June 13, 1944 |
| 2,427,764 | Carson | Sept. 23, 1947 |